(12) United States Patent
Kim

(10) Patent No.: US 11,861,535 B2
(45) Date of Patent: Jan. 2, 2024

(54) METHOD AND SYSTEM FOR ONLINE CONTENTS REGISTRATION AND TRANSACTION BASED ON USER ACTIVE SELECTION

(71) Applicant: DUBEDUB CO., LTD., Seoul (KR)

(72) Inventor: Seok Hwan Kim, Seoul (KR)

(73) Assignee: DUBEDUB CO., LTD., Seoul (KR)

( * ) Notice: Subject to any disclaimer, the term of this patent is extended or adjusted under 35 U.S.C. 154(b) by 0 days.

(21) Appl. No.: 17/900,444

(22) Filed: Aug. 31, 2022

(65) Prior Publication Data

US 2022/0414584 A1 Dec. 29, 2022

Related U.S. Application Data

(63) Continuation of application No. PCT/KR2021/010612, filed on Aug. 10, 2021.

(30) Foreign Application Priority Data

Dec. 15, 2020 (KR) .......................... 10-2020-0175381

(51) Int. Cl.
*G06Q 10/06* (2023.01)
*G06Q 10/0631* (2023.01)
*G06Q 40/12* (2023.01)

(52) U.S. Cl.
CPC ... *G06Q 10/063118* (2013.01); *G06Q 40/125* (2013.12)

(58) Field of Classification Search
CPC ....................................................... G06Q 10/06
See application file for complete search history.

(56) References Cited

U.S. PATENT DOCUMENTS

2006/0015904 A1* 1/2006 Marcus .................... H04N 7/16
   348/E7.071
2008/0010601 A1* 1/2008 Dachs .................... H04N 5/222
   348/E5.022

(Continued)

FOREIGN PATENT DOCUMENTS

KR  20090131228 A  12/2009
KR  20100123094 A  11/2010

(Continued)

OTHER PUBLICATIONS

Esta de Fossard, Write a Radio Serial Drama for Social Development A Script Writer's Manual, Population Communication Services The Johns Hopkins University School of Public Health, 1996. (Year: 1996).*

(Continued)

*Primary Examiner* — Kurtis Gills
(74) *Attorney, Agent, or Firm* — Yongsok Choi

(57) ABSTRACT

A method for online contents registration is provided. The method includes registering a contents manuscript to a contents management server, registering a voice source generated by a voice actor to the contents management server based on the contents manuscript, providing the voice source to a user through the contents management server, registering video contents created by the user to the contents management server based on the voice source, and distributing profits generated based on consumption or distribution of the created video contents.

6 Claims, 4 Drawing Sheets

(56) References Cited

U.S. PATENT DOCUMENTS

| | | | | |
|---|---|---|---|---|
| 2010/0008639 A1* | 1/2010 | Greenberg | ............ | G06Q 10/06 |
| | | | | 386/E5.001 |
| 2012/0016809 A1* | 1/2012 | Frolov | ................... | G06Q 30/02 |
| | | | | 705/36 R |
| 2012/0311448 A1* | 12/2012 | Achour | ................ | G06Q 10/101 |
| | | | | 715/723 |
| 2013/0151970 A1* | 6/2013 | Achour | ................ | G06Q 10/101 |
| | | | | 715/723 |
| 2013/0204612 A1* | 8/2013 | Threewits | .............. | G09B 19/00 |
| | | | | 704/9 |
| 2016/0063114 A1* | 3/2016 | Marino | .................. | H04H 60/07 |
| | | | | 707/754 |
| 2017/0337912 A1* | 11/2017 | Caligor | .............. | H04N 21/4341 |
| 2019/0110110 A1* | 4/2019 | Yoshiga | ............... | G11B 27/102 |
| 2022/0138797 A1* | 5/2022 | Wedel | ................ | G06Q 30/0261 |
| | | | | 705/14.5 |

FOREIGN PATENT DOCUMENTS

| | | | |
|---|---|---|---|
| KR | 101590554 B1 | 1/2016 | |
| KR | 20190075722 A | 7/2019 | |
| KR | 20200045852 A | 5/2020 | |
| KR | 20200121671 A | 10/2020 | |
| WO | WO-2018236327 A1 * | 12/2018 | ............. G06F 15/76 |

OTHER PUBLICATIONS

Korean Office Action issued by Korean Intellectual Property Office, dated May 21, 2022, pp. 1-6.

\* cited by examiner

METHOD AND SYSTEM FOR ONLINE CONTENTS REGISTRATION AND TRANSACTION BASED ON USER ACTIVE SELECTION

CROSS-REFERENCE TO RELATED APPLICATIONS

This application is a continuation of International Application No. PCT/KR2021/010612 filed on Aug. 10, 2021, which claims priority to Korean Patent Application No. 10-2020-0175381 filed on Dec. 15, 2020.

TECHNICAL FIELD

The present disclosure relates to a method and a system for online contents registration and transaction based on a user active selection. More specifically, the present disclosure relates to a method of consuming voice contents used for broadcasting and entertainment contents through active casting by the autonomy of individual users or recipients, rather than casting by a producer, a method for work registration and online transaction of a manuscript for dubbing therefor, and a method relating to distribution and transaction of voice works generated through the online transaction, in particular, related to documentaries, films, animations, music, etc.

BACKGROUND ART

Conventionally, cultural contents such as broadcasting programs or music that require voice dubbing or vocal voice have a structure in which viewers and recipients have no choice but to accept or consume a final finished version, which is one resulting product, derived by a final dubbing job on an intermediate resulting product randomly created by a professional producer who exclusively owns all production sources, which are elements constituting contents, by editing the elements, through casting, which is also the exclusive rights of the producer.

SUMMARY

Technical Problem

The existing voice contents supply and acceptance method has a problem in that choices of consumers are extremely limited, and many sources used for editing are wasteful since only some of the sources are also limitedly used during an editing process. Moreover, as described above, the existing method has an unreasonable and unproductive distribution structure of supplying and consuming only one contents to the market as the final result produced by the one-sided taste of the producer who has all the rights.

The present disclosure is directed to providing a system and method to solve the above problems through transaction policies and methods for granting voice and vocal casting rights to a real user or a consumer who is a recipient, not to a producer, to induce production and supply of various resulting products, and furthermore, registering and easily transacting a dubbing manuscript and voice casting data online so that more diverse works may be produced.

Technical Solution

In one aspect of the present disclosure, there is provided a method for online contents registration including registering a contents manuscript in a contents management server; registering a voice source generated by a voice actor based on the contents manuscript in the contents management server; providing the voice source to a user through the contents management server; registering video contents created by the user based on the voice source to the contents management server; and distributing profits generated based on consumption or distribution of the created video contents.

The method may further include purchasing, by the voice actor, the contents manuscript; and paying royalties to a registrant of the contents manuscript based on the purchasing of the contents manuscript.

The purchasing, by the voice actor, of the contents manuscript may include generating a serial number related to the contents manuscript, and determining whether to register the voice source generated by the voice actor based on the received serial number when registering the voice source in the contents management server.

The contents manuscript may be a broadcast manuscript, and the video contents created by the user may be created based on a plurality of voice sources generated by a plurality of voice actors.

The distributing of the profits generated based on consumption or distribution of the created video contents may include paying royalties to the voice actor.

The voice source generated by the voice actor may be a vocal source, and the video contents created by the user may be music contents.

The providing of the voice source to the user through the contents management server may include providing music recorded (MR) together with the voice source to the user, and generating the music contents based on a combination of a plurality of vocal sources by the user.

In another aspect of the present disclosure, there is provided a contents management server for online contents registration and management including a contents manuscript registration management unit configured to register a contents manuscript; a voice source registration management unit configured to register a voice source generated by a voice actor based on the contents manuscript; a user information management unit configured to provide the voice source to a user; a contents registration management unit configured to register video contents created by the user based on the voice source; and a sales processing unit configured to distribute profits generated based on consumption or distribution of the created video contents.

The voice actor may purchase the contents manuscript through the contents manuscript registration management unit and pay royalties to a registrant of the contents manuscript based on purchase of the contents manuscript through the sales processing unit.

The contents manuscript registration management unit may be configured to generate a serial number related to the contents manuscript when the voice actor purchases the contents manuscript, and the voice source registration management unit is configured to determine whether to register the voice source generated by the voice actor based on the received serial number when registering the voice source.

The contents manuscript may be a broadcast manuscript, and the video contents created by the user may be created based on a plurality of voice sources generated by a plurality of voice actors.

The sales processing unit may be configured to pay royalties to the voice actor when distributing profits generated based on consumption or distribution of the created video contents.

The voice source generated by the voice actor may be a vocal source, and the video contents created by the user may be music contents.

The user information management unit may be configured to provide music recorded (MR) together with the voice source to the user, and the music contents may be generated based on a combination of a plurality of vocal sources by the user.

Advantageous Effects

The present disclosure may provide an online contents platform capable of generating and registering online contents based on the active selection of a platform user, and consuming and transacting variously produced n-th works.

The present disclosure may also provide an online contents platform in which the casting editing authority conventionally concentrated on a broadcast producer extends to general consumer, which causes an expansion to a plurality of contents that are variously modified by the consumer or the user to be consumed and distributed, rather than the final one contents derived from the lead of the conventional producer.

In addition, a broadcast manuscript, which is the work of the existing broadcast writer, is paid a manuscript fee for one-time broadcast transmission from a broadcaster or a producer, and thereafter, is not protected or utilized as a substantial copyright since the broadcast manuscript has no effect of use profit. However, according to the present disclosure, it is possible to enable just and safe copyright registration and continuous creation of royalties.

In addition, in the prior art, the sound source of a lyricist and a composer was also only able to receive the royalty for one final produced song, but according to the present disclosure, the sound source is naturally expanded and reproduced as a work for the sound source downloaded and re-produced by a recipient or a user, and thus profit creation may be maximized.

In addition, according to the present disclosure, many actors and ordinary people buy the manuscript of a writer without waiting for the casting of the producer, produce narration and voice acting contents in a way that singers release albums, upload the contents to a distribution server, and receive their own royalties as much as the number of clicks and downloads of the contents, and thus it will be possible to expand the distribution structure of voice contents.

In addition, according to the present disclosure, consumers or recipients of modern broadcasting, cultural contents, and music contents have already developed excellently the desire, ability, and sense with respect to editing of the contents that they consume beyond simple end consumers, and thus a lot of various customized contents that suit personal taste appear, which may greatly contribute to the diversification of the cultural market.

In addition, according to the present disclosure, voice dubbing is the most powerful method to overcome the limitation of information among various methods for resolving language barriers in each country in consuming cultural contents due to the rapid spread of Korean wave worldwide, and thus the scalability of cultural broadcast contents may be greatly enhanced.

In addition, there are countless countries around the world that require voice dubbing, i.e., localization, such as documentaries, dramas, animations, movie music, etc., and according to the present disclosure, various options may be provided to contents consumers in these countries.

In addition, according to the present disclosure, a distribution ecosystem of new intellectual property rights and music culture contents that did not exist before is formed, and thus a new market that also did not exist before worldwide may be formed.

The effects of the present disclosure are not limited to the description mentioned above, and other effects not mentioned will be clearly understood by those skilled in the art from the following description.

DETAILED DESCRIPTION

Figure 1:
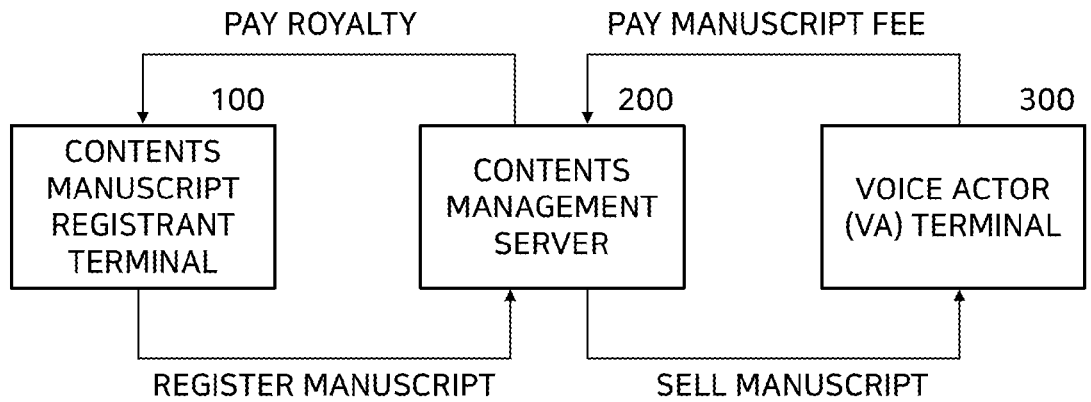
FIG. 1 is an exemplary diagram for explaining a process of registering and selling a contents manuscript according to an embodiment of the present disclosure.

Hereinafter, embodiments of the present disclosure will be described in detail with reference to the accompanying drawings so that those of ordinary skill in the art may easily carry out the present disclosure. However, the present disclosure may be embodied in various different forms and is not limited to the embodiments described herein. And, in order to clearly describe the embodiment of the present disclosure in the drawings, parts irrelevant to the description are omitted.

The terms used herein are used only to describe specific embodiments, and are not intended to limit the present disclosure. The singular expression may include the plural expression unless the context clearly dictates otherwise.

In the present specification, it may be understood that the terms "comprise", "have" or "include" are intended to specify the presence of a feature, a number, a step, an operation, a component, a parts, or a combination thereof described in the specification, but do not preclude the possibility of the presence or addition of one or more other features or numbers, steps, operations, components, parts, or combinations thereof.

In addition, configuration units shown in the embodiments of the present disclosure are independently illustrated to represent different characteristic functions, and does not mean that each configuration unit includes separate hardware or a single software configuration unit. That is, each configuration unit is listed and described as a respective configuration unit for convenience of description, and at least two configuration units of each configuration unit are combined to form a single configuration unit, or one configuration unit may be divided into a plurality of configuration units to perform a function. Integrated embodiments and separate embodiments of each of the configuration units are also included in the scope of the present disclosure unless departing from the spirit of the present disclosure.

In addition, the following embodiments are provided to more clearly explain to those of ordinary skill in the art, and the shapes and sizes of elements in the drawings may be exaggerated for more clear description.

Hereinafter, preferred embodiments of the present disclosure will be described in detail with reference to the accompanying drawings.

FIG. 1 is an exemplary diagram for explaining a process of registering and selling a contents manuscript according to an embodiment of the present disclosure.

Referring to FIG. 1, the contents manuscript in a contents manuscript registrant terminal 100 may be, for example, a broadcast manuscript, a movie manuscript, a documentary manuscript, or an animation manuscript, and a contents manuscript registrant may be various writers such as a broadcast writer, a screenwriter, a documentary writer, or an animation writer, or a writers association, etc. Also, in a voice actor (VA) terminal 300, a VA may be a voice actor, an actor, or a singer who is a performer of various types of manuscripts.

For example, a writer such as the broadcast writer may register the contents manuscript in a contents management server 200 through the contents manuscript registrant terminal 100, and sell the manuscript through the contents management server 200, so that the VA who is the performer may purchase the manuscript through the VA terminal 300. At this time, a charging method between the contents manuscript registrant and the VA may a contract in various ways, such as a lump sum payment and a running guarantee. When a manuscript fee is deposited through the VA terminal 300, the royalty may be paid to the contents manuscript registrant according to a predetermined contract type through the contents management server 200.

In addition, when a manuscript is purchased and downloaded from the VA terminal 300, it is possible to prevent the reuse of the manuscript by another VA by giving a different serial number to each manuscript. More specifically, when the VA terminal 300 purchases the contents manuscript, a serial number related to the corresponding contents manuscript is generated, and when registering a voice source generated by the VA terminal 300 in the contents management server 200, the voice source is registered only when the corresponding serial number is input, and thus, it is possible to determine whether to register the voice source based on the validity of the received serial number.

Figure 2:
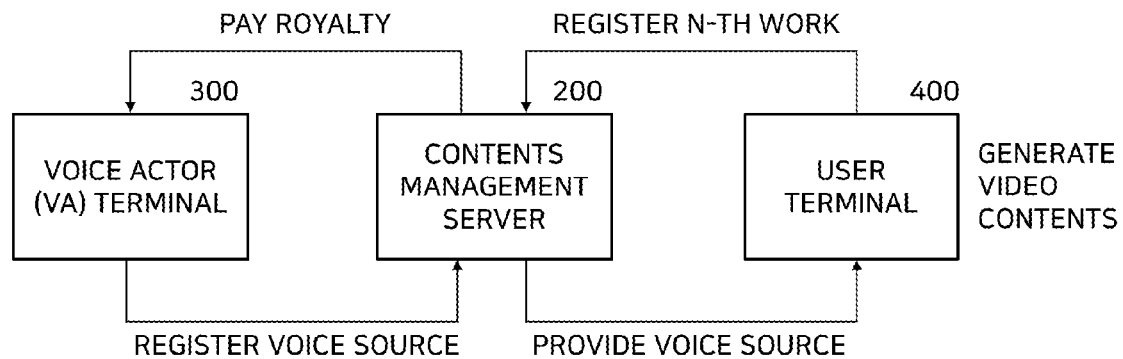
FIG. 2 is an exemplary diagram for explaining a process of registering and selling a voice source (contents) according to an embodiment of the present disclosure.

FIG. 2 is an exemplary diagram for explaining a process of registering and selling a voice source (contents) according to an embodiment of the present disclosure.

Referring to FIG. 2, the VA may generate the voice source or voice contents based on a purchased contents manuscript, and register the generated voice source or voice contents in the contents management server 200. In addition, the contents management server 200 may provide various registered voice sources to a user terminal 400 through an online platform provided through the contents management server 200, and a user may create video contents based on the voice source provided through the user terminal 400. The video contents may be generated by the user terminal 400 by combining a plurality of voice sources generated by a plurality of VAs.

At this time, the video contents created by the user, that is, an n-th work, may be registered in the contents management server 200. In addition, the contents management server 200 may perform a function of distributing profits generated based on the consumption or distribution of the video contents created by the user of the online platform, and provide part of profits generated based on the consumption and distribution of the n-th work newly generated by the user terminal 400 to the VA as royalty.

Figure 3:
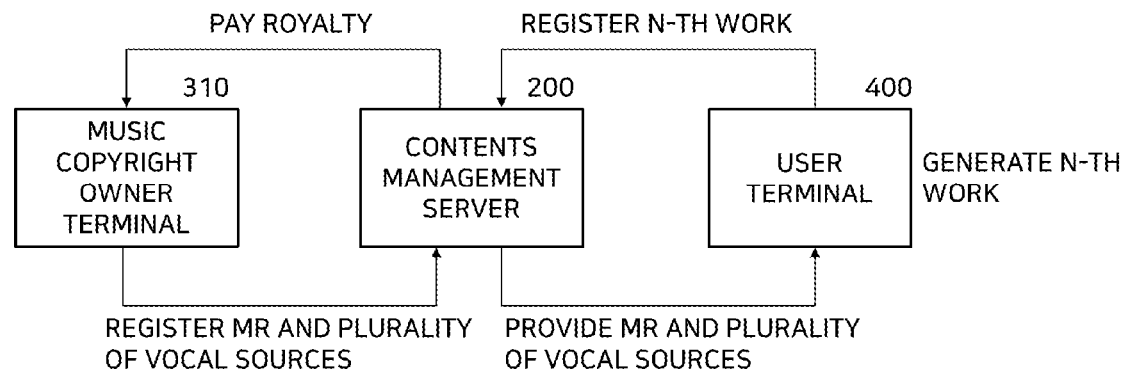
FIG. 3 is an exemplary diagram for explaining a process related to vocal changing of a music work according to an embodiment of the present disclosure.

FIG. 3 is an exemplary diagram for explaining a process related to vocal changing of a music work according to an embodiment of the present disclosure.

For example, taking an idol group consisting of five group members as an example, first, a music copyright holder, who is the original copyright owner, may separate music recorded (MR), which is a background music, and a vocal part of each group member and register the MR and the vocal part in the contents management server 200. At this time, each of the five group members may upload the vocal part to the contents management server 200 in the form of vocal pieces by collectively digesting each part of the corresponding entire song.

As described above, the MR and a plurality of vocal sources registered in the contents management server 200 may be provided to the user terminal 400, and a user may combine a plurality of vocals of each group member according to his or her preference with the MR provided by default to create and enjoy his or her own music in the final mixed form. As such, an n-th work reproduced by the user terminal 400 may be registered through the contents management server 200, and part of profits generated by the consumption or distribution of the n-th work may be returned to a music copyright owner as royalty so that a new profit may be created. That is, by newly giving the distribution of vocal of each group member in the original song from the user's point of view, music contents regenerated with different tastes may be created by the user.

The example of FIG. 3 may be seen as corresponding to performing the role of the VA in FIG. 2 through the vocal of each group member, the voice source in FIG. 2 may correspond to the vocal source in FIG. 3, and the video contents created by the user in FIG. 2 may correspond to the music contents newly created by the user in FIG. 3.

Figure 4:
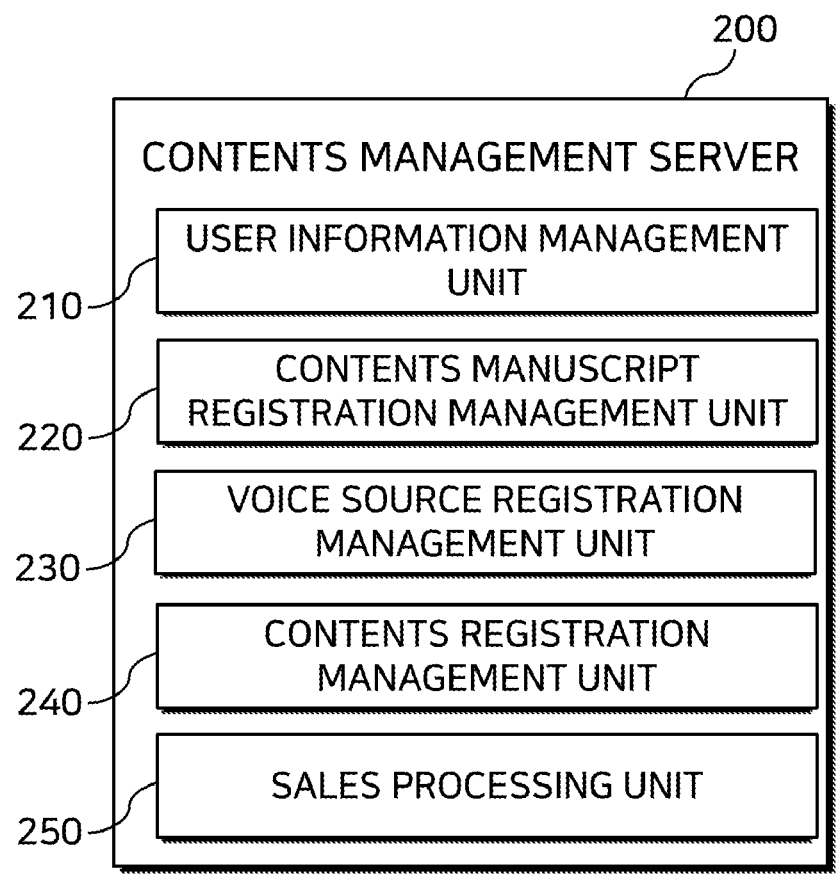
FIG. 4 is a block diagram for explaining a configuration of a contents management server according to an embodiment of the present disclosure.

FIG. 4 is a block diagram illustrating a configuration of a contents management server according to an embodiment of the present disclosure.

Referring to FIG. 4, the contents management server 200 for online contents registration and management may include a user information management unit 210, a contents manuscript registration management unit 220, a voice source registration management unit 230, a contents registration management unit 240, a sales processing unit 250, etc. Each of the user information management unit 210, the contents manuscript registration management unit 220, the voice source registration management unit 230, the contents registration management unit 240, and the sales processing unit 250 be a program module in the form of operating systems, application program modules, and other program modules stored in the memory of the server 200. The processor of the contents management server 200 executes the program module to perform functions described below.

The user information management unit 210 may be configured to register and manage user or member information of a platform managed through the contents management server 200, and also provide a voice source (contents) and video contents registered in the contents management server 200 to a legitimate user to download or play the voice source (contents) and the video contents. In addition, the user information management unit 210 may provide MR together with a voice source composed of a plurality of vocals to the user terminal 400, and the user may create new music a combination of the plurality of vocal sources accordingly.

The contents manuscript registration management unit 220 may be configured to register a contents manuscript and may be configured to manage the registered contents manuscript. For example, a VA may purchase the contents manuscript through the contents manuscript registration management unit 220. Also, the contents manuscript registration management unit 220 may generate a serial number related to the contents manuscript when the VA purchases the contents manuscript.

The voice source registration management unit 230 is configured to register the voice source (contents) generated by the VA or the MR and the plurality of vocal sources based on the registered contents manuscript, and manage the registered voice source (contents), MR, and vocal sources. The voice source registration management unit 230 may determine whether to register the voice source based on the validity of the serial number received from the VA terminal 300 when registering the voice source generated by the VA.

The contents registration management unit 240 is configured to register video contents created by the user based on the voice source or music contents newly created by the user based on vocal changing, and manage the contents registered by the user. For example, the contents manuscript may be a broadcast manuscript, and the contents created by the user may be video contents created based on a plurality of voice sources generated by a plurality of VAs.

The sales processing unit 250 may be configured to distribute profits generated based on the consumption or distribution of the generated video contents or music contents, and pay at least part of profits generated by the consumption or distribution of an n-th work created by the user to a contents manuscript registrant, a VA, or a music copyright owner as royalties based on a predetermined method.

The contents management server 200 according to the present disclosure may include the voice source registration management unit 230 as a server that stores voice contents that a consumer, a user and a recipient are able to directly cast, and may include the contents registration management unit 240 as a server that stores contents, which is an n-th work composed of images, music, effects, etc. and newly generated. Various voice sources and voice contents must be produced and uploaded in the voice source registration management unit 230 so that many choices are possible. To this end, for example, a structure and method in which a broadcast manuscript supplied with a payment from a producer may be supplied to an actor who wants to record and upload the broadcast manuscript must be preceded.

There is also no system for writers to put broadcast manuscripts in the air and protect their rights and make transactions, but through the configuration of the sales processing unit 250 of the contents management server 200 according to the present disclosure, a method of uploading dubbed manuscripts written by broadcast writers and other writers, charging together with copyright registration, and making transactions may be provided. To this end, the present disclosure may also include the contents manuscript registration management unit 220 that may upload and store manuscripts of broadcast writers by field, by work, and by casting, and may also safely protect the copyright of a writer and the copyright of a resulting product of voice contents through an online platform capable of charging when selling the contents manuscript to a person who wants the contents manuscript.

In addition, the present disclosure may be developed to a method of giving editing rights including casting rights to the user, and thus, the user may edit the source provided to the producer in various ways, upload the source to the server, and provide the source to the user by part, and the user may provide the online platform capable of combining parts of the source, combining voice (acting) files, and producing and consuming various video resulting products with a new atmosphere.

Figure 5:
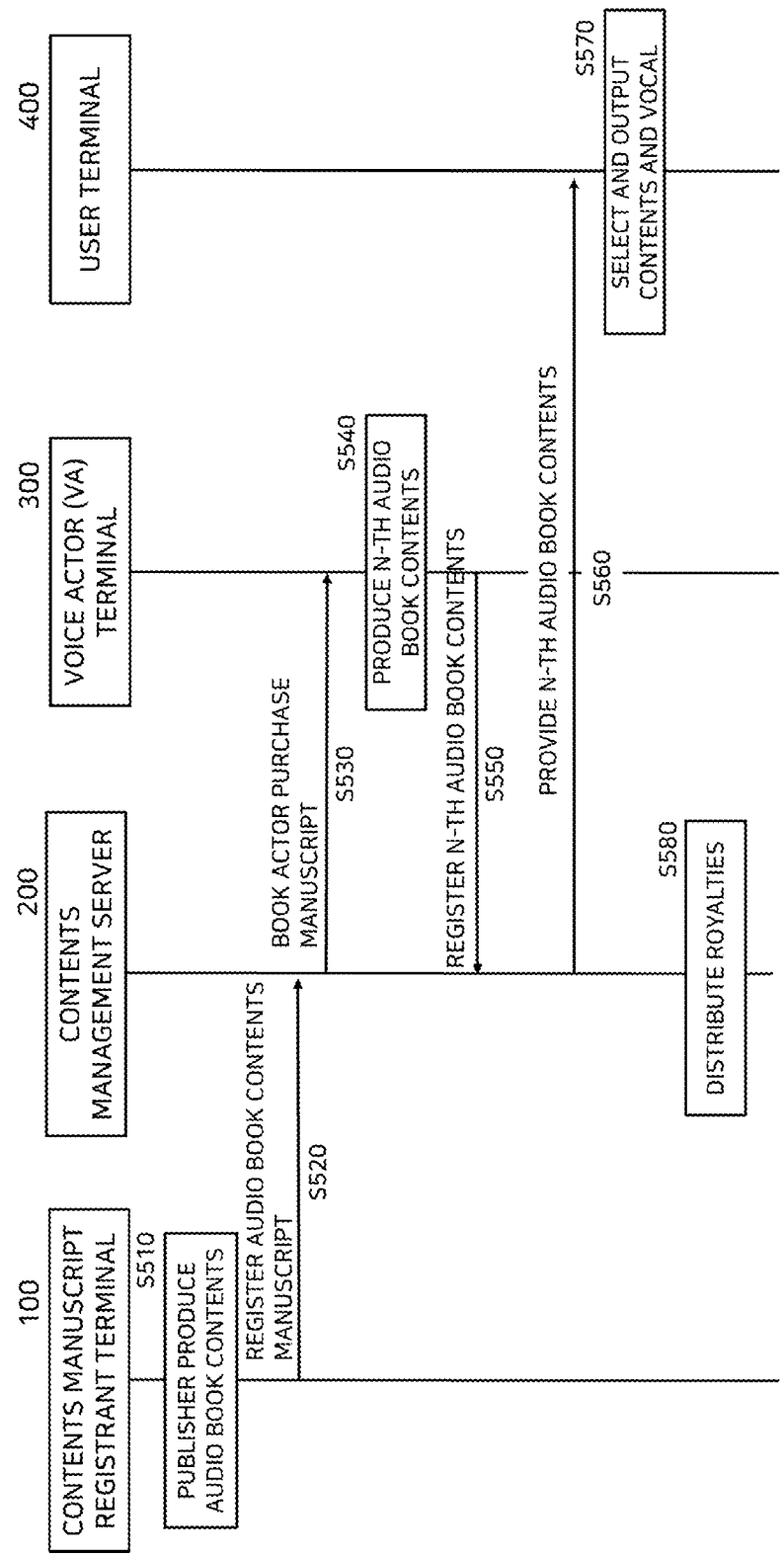
FIG. 5 is a flowchart for explaining a method for generating, registering, and selling n-th audio book contents according to an embodiment of the present disclosure.

FIG. 5 is a flowchart for explaining a method for generating, registering, and selling n-th audio book contents according to an embodiment of the present disclosure.

Referring to FIG. 5, a contents manuscript registrant may be a publisher, produce audio book contents through the contents manuscript registrant terminal 100 (S510), and register a produced audio book contents manuscript in the contents management server 200 (S520).

Audio book contents may be provided to book actors through an online platform through the contents management server 200, and a book actor who is a VA may purchase a desired manuscript through the VA terminal 300 (S530). The book actor may produce the n-th audio book contents based on his/her own voice based on a purchased manuscript (S540), and may register the generated n-th audio book contents in the contents management server 200 (S550).

The contents management server 200 may provide the n-th audio book contents registered through the VA terminal 300 to users (S560), and a user of the online platform may select the audio book contents through the user terminal 400, select and output a vocal to which the user wants to listen, and listen to the n-th audio book contents produced with a book actor's voice.

As such, based on profits according to the n-th audio book contents consumed through the selection of the user terminal 400, royalties may be appropriately distributed to the contents manuscript registrant and the book actor by a method previously determined by the contents management server 200.

Figure 6:
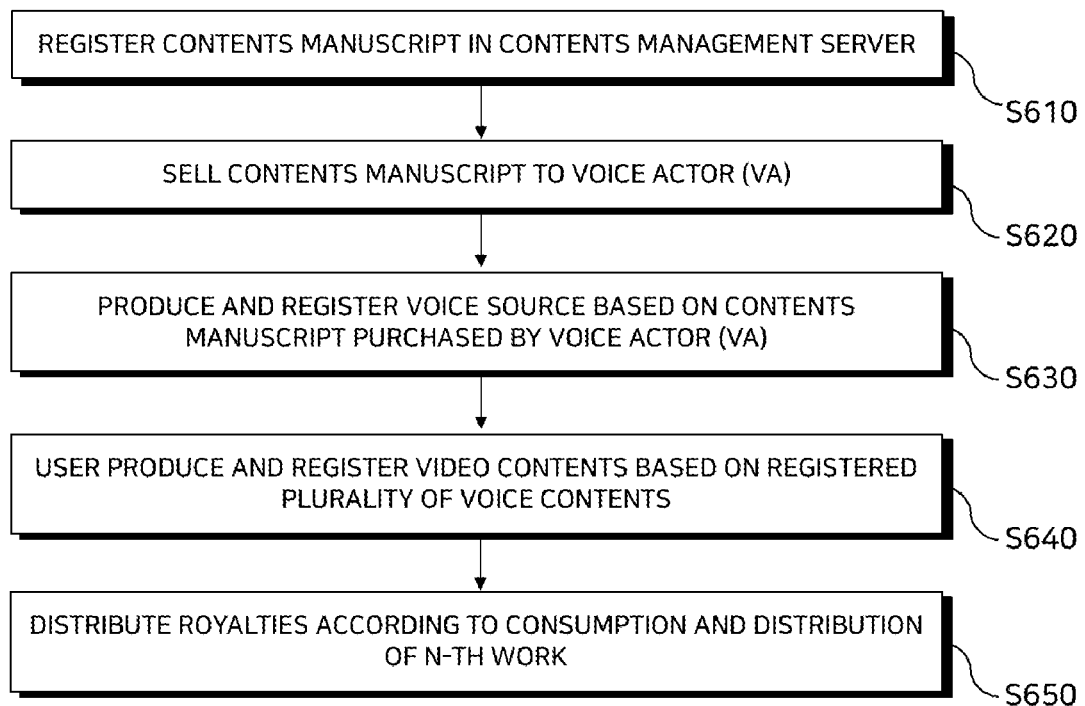
FIG. 6 is a flowchart for explaining a generation, registration, and selling method of an n-th work according to an embodiment of the present disclosure.

FIG. 6 is a flowchart for explaining a generation, registration, and selling method of an n-th work according to an embodiment of the present disclosure.

First, a contents manuscript may be registered in a contents management server (S610). For example, a broadcast manuscript may be registered as the contents manuscript by a broadcast writer.

The contents manuscript may be sold by a VA such as an actor or a voice actor selecting a desired contents manuscript through the contents management server (S620).

The VA may produce a new voice source and voice contents using his/her own voice based on the purchased contents manuscript, and may register the produced voice contents in the contents management server (S630).

The user of the online platform may produce new video contents based on a plurality of voice contents registered by various VAs and register the produced video contents in the contents management server (S640). For example, the user may combine a plurality of voice contents of a desired VA and edit the video contents to upload and publish the video contents produced by the user.

As such, based on profits generated by publishing and consuming the video contents produced by the user to and by online platform users, royalties according to consumption and distribution of the n-th work may be distributed a VA, a contents manuscript registrant, a video contents creator (user), etc. according to a predetermined standard (S650).

Although operations are illustrated in a particular order in the drawings of the present disclosure, it should not be understood that such operations are performed in the illustrated particular order or in a sequential order, or that all the illustrated operations need to be performed to achieve a desired result.

Although the present disclosure has been described with reference to the embodiment shown in the drawings, which is merely exemplary, it will be understood by those skilled in the art that various modifications and equivalent other embodiments are possible therefrom. Accordingly, the true technical protection scope of the present disclosure should be determined by the technical spirit of the appended claims.

DESCRIPTION OF REFERENCE NUMERALS

100: contents manuscript registrant terminal
200: contents management server
300: voice actor (VA) terminal
310: music copyright owner terminal
400: user terminal

What is claimed is:

1. A method for online contents registration comprising:
registering, by a contents manuscript registrant terminal, a contents manuscript to a contents manuscript registration management unit, the contents manuscript including a plurality of vocal parts;
purchasing, by a plurality of voice actor terminals, the contents manuscript through the contents manuscript registration management unit;
registering, by each of the plurality of voice actor terminals, each of a plurality of voice sources generated by each voice actor with respect to a first vocal part of the plurality of vocal parts of the contents manuscript to a voice source registration management unit;
registering, by each of the plurality of voice actor terminals, each of a plurality of voice sources generated by each voice actor with respect to a second vocal part of the plurality of vocal parts of the contents manuscript to the voice source registration management unit;
providing the plurality of voice sources to a user terminal of a user through a user information management unit;
receiving, by the user terminal, selection of the registered voice source of a desired voice actor from among the plurality of voice sources generated by the plurality of voice actor terminals with respect to the first vocal part;
receiving, by the user terminal, selection of the registered voice source of another desired voice actor from among the plurality of voice sources generated by the plurality of voice actor terminals with respect to the second vocal part;
generating by the user terminal, video contents by combining the selected registered voice source of the desired voice actor with respect to the first vocal part and the selected registered voice source of another desired voice actor with respect to the second vocal part;
registering, by the user terminal, the video contents generated by the user terminal based on the plurality of voice sources to a contents registration management unit;
distributing, by a sales processing unit, profits generated based on consumption or distribution of the video contents generated by the user terminal to a copyright owner for the contents manuscript, the desired voice actor and the another desired voice actor, and the user who created the video contents by combining the selected registered voice source of the desired voice actor and the selected registered voice source of another desired voice actor; and paying royalties for a registrant of the contents manuscript based on the purchasing of the contents manuscript by the sales processing unit,
wherein the contents manuscript is a broadcast manuscript, and
wherein the purchasing, by the voice actor, of the contents manuscript comprises generating a serial number related to the contents manuscript, and determining whether to register the voice source generated by the voice actor in the voice source registration management unit based on the serial number received from the voice actor.

2. A contents management server for online contents registration and management, the contents management server comprising:
a contents manuscript registration management unit configured to register a contents manuscript and purchase the contents manuscript by a plurality of voice actor terminals, the contents manuscript including a plurality of vocal parts;
a voice source registration management unit configured to register:
each of a plurality of voice sources generated by each voice actor terminal with respect to a first vocal part of the plurality of vocal parts of the contents manuscript; and
each of a plurality of voice sources generated by each voice actor terminal with respect to a second vocal part of the plurality of vocal parts of the contents manuscript;
a user information management unit configured to provide the plurality of voice sources to a user terminal of a user;
a contents registration management unit configured to:
register video contents generated by the user terminal based on the plurality of voice sources; and
a sales processing unit configured to distribute profits generated based on consumption or distribution of the video contents generated by the user terminal,
wherein the contents manuscript is a broadcast manuscript,
the video contents generated by the user terminal are generated by:
actively selecting the registered voice source of a desired voice actor from among the plurality of voice sources generated by the plurality of voice actor terminals with respect to the first vocal part;
actively selecting the registered voice source of another desired voice actor from among the plurality of voice sources generated by the plurality of voice actor terminals with respect to the second vocal part; and
combining the selected registered voice sources of the desired voice actor with respect to the first vocal part and the selected registered voice source of another desired voice actor with respect to the second vocal part, and
wherein the sales processing unit distributes the generated profits to a copyright owner for the contents manuscript, the desired voice actor and the another desired voice actor, and the user who created the video contents by combining the selected registered voice source of the desired voice actor and the selected registered voice source of another desired voice actor,
wherein royalties for a registrant of the contents manuscript is paid based on purchase of the contents manuscript through the sales processing unit, wherein the contents manuscript registration management unit is configured to generate a serial number related to the contents manuscript when the contents manuscript is purchased by the voice actor terminal, and wherein the voice source registration management unit is configured to determine whether to register the voice source generated by the voice actor based on the serial number from the voice actor.

3. The method of claim 1, further comprising:

separating, by a plurality of music copyright owner terminals, a music work performed by a group consisting of a plurality of group members into a music recorded (MR) and a vocal part of each group members; and registering, by the plurality of music copyright owner terminals, the MR and each of the plurality of vocal parts to a voice source registration management unit.

4. The contents management server of claim 2, further comprising:

a music copyright owner terminal configured to separate a music work performed by a group consisting of a plurality of group members into a music recorded (MR) and a vocal part of each group members and register the MR and the vocal parts to a voice source registration management unit.

5. The method of claim 3, further comprising:

providing the MR together with the vocal parts to the user terminal; and generating voice content based on a combination of the MR and vocal parts of a desired group member by the user terminal.

6. The contents management server of claim 4, wherein the content management server is further configured to:

provide the MR together with the vocal parts to the user terminal; and generate voice content based on a combination of the MR and vocal parts of a desired group member by the user terminal.

\* \* \* \* \*